United States Patent [19]

Ambrogi

[11] 4,260,405

[45] Apr. 7, 1981

[54] PRESS FORMING GLASS ARTICLES HAVING ENCAPSULATED MATERIAL

[75] Inventor: Raymond R. Ambrogi, Corning, N.Y.

[73] Assignee: Corning Glass Works, Corning, N.Y.

[21] Appl. No.: 51,711

[22] Filed: Jun. 25, 1979

[51] Int. Cl.³ ............................................. C03B 11/00
[52] U.S. Cl. .......................................... 65/42; 65/45; 65/48
[58] Field of Search ................... 65/36, 42, 43, 45, 47, 65/48

[56] References Cited

U.S. PATENT DOCUMENTS

| | | | |
|---|---|---|---|
| 314,828 | 3/1885 | Haines | 65/146 |
| 502,461 | 8/1893 | Irwin | 65/40 R |
| 1,403,268 | 1/1922 | Schmidt | 65/42 |
| 2,026,606 | 1/1936 | Bausch | 65/156 |
| 2,219,573 | 10/1940 | Fraenckel | 65/43 |
| 3,305,335 | 2/1967 | Jewell et al. | 65/51 |
| 3,410,989 | 11/1968 | Laws, Jr. | 219/438 |

FOREIGN PATENT DOCUMENTS

742685 12/1955 United Kingdom ...................... 65/47

OTHER PUBLICATIONS

Mechanical & Chemical Aspects of Glass Sealing–Part II, Apr. 78, Glass Industry, pp. 19–26.

Primary Examiner—Arthur D. Kellogg
Attorney, Agent, or Firm—Burton R. Turner; John P. DeLuca

[57] ABSTRACT

In the pressing of articles from molten glass, an insert of selected material is encapsulated within the glass article as the article is being press formed.

9 Claims, 6 Drawing Figures

PRESS FORMING GLASS ARTICLES HAVING ENCAPSULATED MATERIAL

BACKGROUND OF THE INVENTION

Various forms of encapsulating materials in glass articles have been known in the past such as shown by the ornamental glass bottle of U.S. Pat. No. 502,461 and the wired glass ribbon of U.S. Pat. No. 3,305,335. The ornamental glass bottle of the former patent has encapsulated particles formed in the bottom wall by initially pressing molten glass onto a layer of pulverized glass particles to form an amalgamation between the two in the form of a circular base. The base, after being rigidified, is inverted and placed on the bottom of a blow mold and a glass bottle is blown in the mold, which bottle covers the amalgamated particles of the base and encapsulates the particles between the pressed glass and the blown glass into the bottom of the blown bottle. In the latter patent, a wire web is encapsulated between two layers of molten glass as it passes between a pair of casting rollers to form a ribbon of wired glass.

In addition to full encapsulation of materials in glass articles as shown in said aforementioned patents, it is also been known to seal or secure articles in molten glass during a pressing operation, such as shown in U.S. Pat. Nos. 314,828 and 2,219,573 and as suggested on page 22 of THE GLASS INDUSTRY, April 1978. In U.S. Pat. No. 314,828, a charge of molten glass is deposited in a mold, and a plunger carrying a metallic shank descends into the molten glass for the purpose of pressing the molten glass into the shape of a glass knob and embedding one end of the shank therewithin. U.S. Pat. No. 2,219,573, on the other hand, discloses the formation of a glass panel having an integral metal frame by positioning the frame within a mold and pressing a gob of molten glass into contact therewith so as to embed an inner peripheral flange of such frame within the glass panel. Such patent also discloses the positionment of pins within a mold assembly so as to press form a gob thereabout and integrally seal the pins in the thus formed glass body. THE GLASS INDUSTRY article entitled "The Mechanical and Chemical Aspects of Glass Sealing—Part II" by Marcus T. Borom (pp.19-26) indicates on page 22 that from a manufacturing standpoint it is possible to form a glass-to-metal seal by embedding metal hardware in a mold, casting glass around it, and transforming the part to a glass-ceramic.

As can be seen from the foregoing prior art, a variety of reasons existed for the desirability of encapsulating or sealing different materials within glass articles. The present invention relates to the pressing of a thermally conducting insert within a pressed glass article, such as top of the stove cooking vessels, for the purpose of providing a more even distribution of heat over heat transmitting surfaces of such vessels, whether the heat be generated by conventional conduction means or by radiation, induction or microwave means. Accordingly, in view of the foregoing, U.S. Pat. No. 3,410,989 is of particular interest. As set forth in such patent, a glass or glass-ceramic article in the form of a cooking vessel has a recess of relatively large planar area formed in the bottom thereof with a graphite heat transfer member positioned in such recess, and a plate of the same material as the vessel overlies such member so as to seal the member within such recess with a high temperature cement. Although it appears that the vessel is initially formed with the recess therein or that it is subsequently machined in the bottom surface thereof such that an outer plate of the same material may be cemented therein with a snug fit, the patent further points out that the vessel could be press formed in a conventional manner and a graphite plate sealed to the bottom thereof by pressing a second gob of molten glass thereon. As envisioned by the patent, the article would initially be press formed from a gob of molten material in a manner known in the art, and then permitted to cool to a temperature below its softening point temperature. A graphite plate would then be positioned adjacent a bottom surface of the article and the article reheated to near its softening point temperature. Another gob of molten material would then be deposited upon the graphite plate and press formed to provide a covering plate for the graphite plate. The molten material of the covering plate would become fusion sealed with the material of the article to hermetically seal the graphite plate within the bottom of the article.

Both the cemented plate method and the second gob method of encapsulating the graphite plate as disclosed in the aforesaid patent, not only require costly and time consuming fabrication techniques, but also tend to trap air in the encapsulated cavity and do not necessarily lend themselves to the bonding of the encapsulated part to the pressed article should such be desired. Further, although not part of the prior art, the applicant is aware of other attempts to encapsulate silicon, graphite and the like in pressed articles wherein an insert was positioned between a first gob or patty and a second gob or patty, and then pressed into an article; and wherein a first gob was initially pressed, an insert placed thereon and a second gob pressed over the first, either with or without a delay between such pressings. However, hereagain, air had a tendency to become trapped about edge portions of the insert, producing defects in the glass article and preventing complete bonding of the insert to the gob material where desired. Further, since these approaches did not provide proper support for the insert, it had a tendency to shift location and/or crack upon pressing.

It thus has been an object of the present invention to provide method and apparatus for easily and economically encapsulating a thermally conductive insert within a pressed article as the article is being press formed from molten glass.

SUMMARY OF THE INVENTION

In its simplest form, the present invention sets forth a new concept for encapsulating a thermally conductive insert within a glass article as such article is being press formed.

A first charge of molten glass is positioned within a mold, and a plunger initially presses the charge into a desired shape and simultaneously presses an insert within the charge so that it lies substantially flush with the upper extent of the initial pressing. A second charge of molten glass is immediately delivered to the initially pressed article so as to be positioned upon the embedded insert, and such second charge is then press formed into the final shape of the article, fusing with the glass of the initial pressing about the periphery of the insert and encapsulating the insert within an integral article. Due to the fact that the insert is initially pressed flush with the surrounding glass of the first charge, no air or other defects are trapped about the insert, thus permitting complete bonding where desired.

DESCRIPTION OF THE PREFERRED EMBODIMENTS

Figure 1:
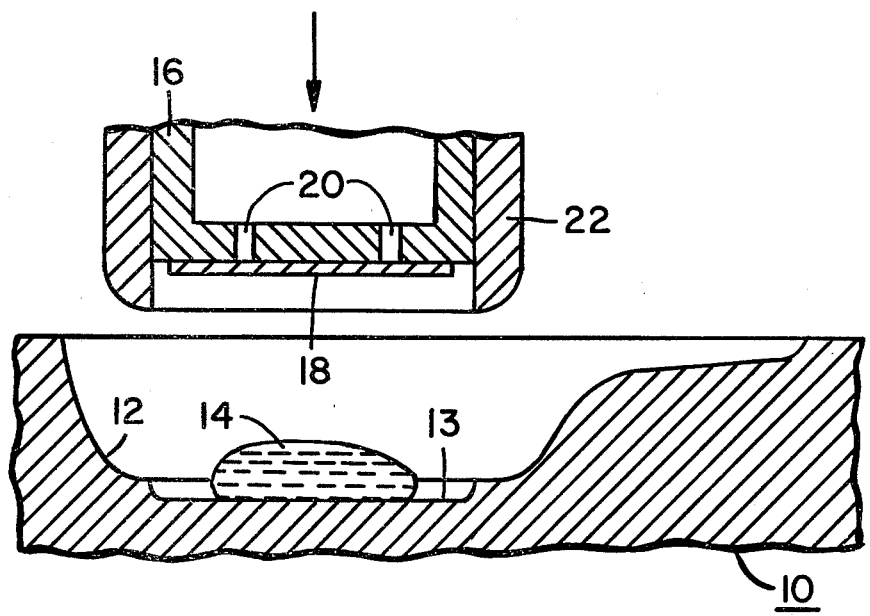
FIGS. 1–4 are a series of fragmental side elevational views in section of forming apparatus illustrating the process steps of the present invention including the loading of a first charge, the initial pressing of an insert within such charge, the loading of a second charge, and the press forming of the finished article, respectively.

Referring now to FIGS. 1–4, a mold 10 having a cavity 12 for forming any suitable article, such as a skillet with an integral handle as shown, is provided in a recess portion 13 with a first change of molten glass such as gob 14. A first plunger 16 retaining an insert 18 to be encapsulated within the final article, such as by means of vacuum ports 20, and an associated ring 22 move downwardly into cavity 12. The plunger and ring form gob 14 into an initially pressed article 14' of predetermined thickness and diameter and simultaneously press insert 18 into the molten gob such that the upper surface of the insert 18 is substantially flush with the upper surface of the initially pressed article 14'. The pressing of the insert into the gob is accomplished without the entrappment of air about its periphery. On withdrawal of the plunger 16, the vacuum applied through ports 20 is released so as to release its hold on insert 18 such that it is retained within initially pressed article 14'.

In view of the fact that the insert is in contact with the cooled plunger 16 during pressing and any desired dewell, the temperature of the insert may be controlled through its contact with the cooled plunger. Although an associated ring 22 has been shown, either free pressing or ring pressing may be used during this initial pressing operation. Further, although vacuum, as suggested in U.S. Pat. No. 2,026,606, is used to retain the insert on the plunger, other modes such as magnetic or mechanical may be used as desired.

Immediately upon withdrawal of plunger 16, and while the initially pressed article 14 is still in a semi molten condition, preferably above its strain point temperature, a second charge of molten glass such as gob 24 is deposited in cavity 12 upon initially pressed article 14', and a second plunger 26 and associated ring 32 for forming the final article 24' is moved downwardly. The plunger 26 and ring 32 press form the gob 24 into article 24' and simultaneously encapsulate insert 18 therewithin upon the fusion bonding of pressed gob 24 with the glass of initially pressed article 14' about the periphery of insert 18, to form integral final article 24' having insert 18 encapsulated wholly therewithin. That is, since the first pressing remains at elevated temperatures when the second gob is pressed, a good fusion bond or glass-to-glass seal is obtained therebetween. Further, due to the fact that insert 18 is pressed substantially flush within the surface of initial pressed article 14', air is not trapped about the insert upon the pressing of the second gob 24, thus permitting the full bonding of the insert to the articles when desired.

Figure 2:
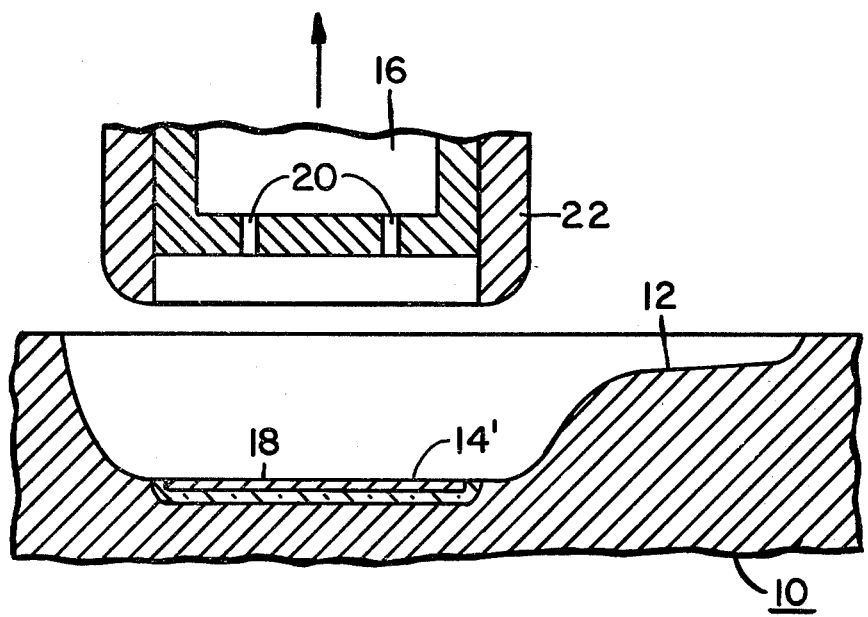
Figure 2A:
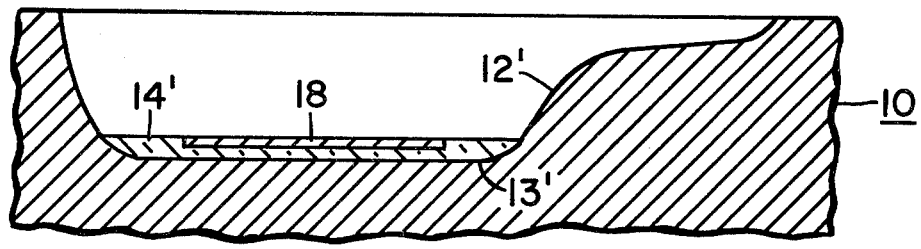
FIGS. 2a and 4a represent the forming of a further embodiment similar to that shown in FIGS. 1–4.
Figure 4A:
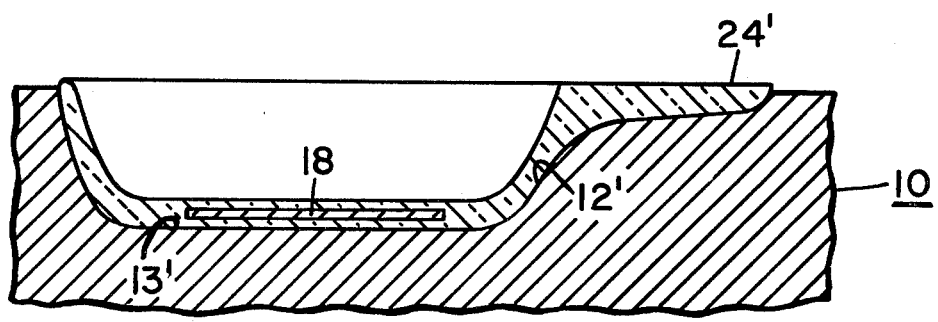
Figure 3:
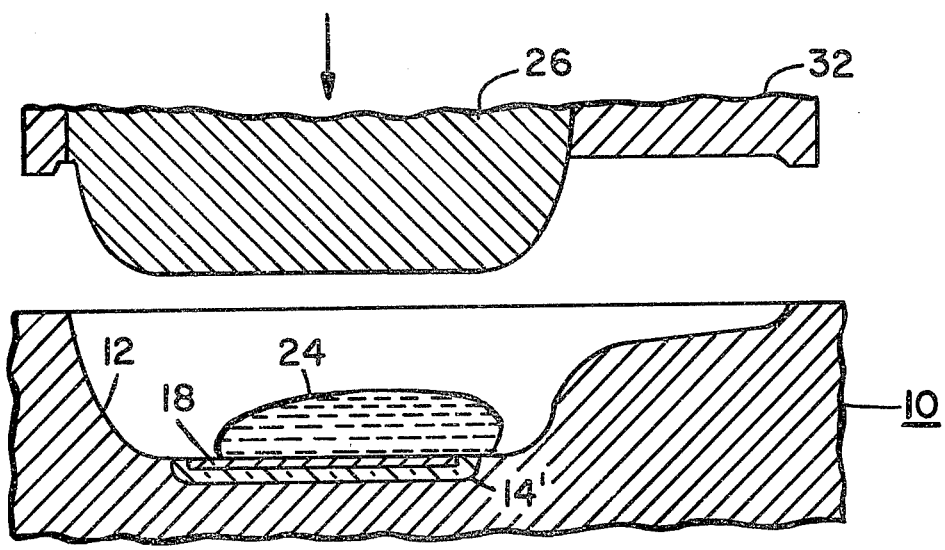
Figure 4:
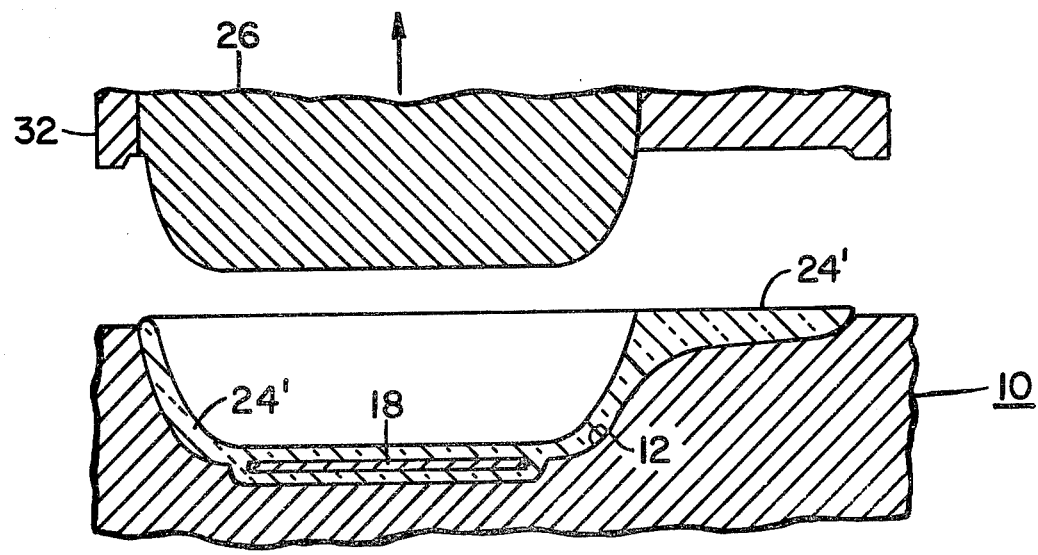

The embodiments shown in FIGS. 2a and 4a are similar to that shown in FIGS. 2 and 4, respectively, except for the fact that the bottom surface 13' of the cavity 12' of mold 10 is substantially flat and is not provided with a foot or recess 13 such as exhibited by cavity 12. Accordingly, when the initial gob 14, deposited upon bottom surface 13', is pressed by a suitable plunger carrying insert 18 and a ring, an initially pressed article 14" is formed in the bottom of cavity 12'. Preferably the article extends across the extent of bottom surface 13' to side wall portions of the cavity with a continuous upper surface composed of the upper surface of insert 18 and the upper extent of initially pressed article 14". Thus a substantially continuous surface is presented for the reception of the second gob 24, such that upon the pressing thereof by means of plunger 26 and ring 32, an integral article 24' is formed having insert 18 encapsulated therein. Further, in view of the fact that the upper surface of the initially formed article 14" extends across the lower extent of cavity 12' and is flush with the upper surface of insert 18, air does not have an opportunity to become trapped about the insert 18 and accordingly defective glass due to entrapped air is reduced and complete bonding may be obtained between the insert 18 and the article 24' if desired. Although it would be possible to form an initially pressed article similar to 14' on the bottom surface 13' of cavity 12', unless the edges were rounded or tapered toward the bottom, a great deal of care would have to be exercised in pressing the second gob 24 in order to avoid the entrapment of air about the periphery of the initially pressed article 14' adjacent bottom surface 13' of the cavity 12'.

If desired, the final article may be press formed by the previously described double gobbing method with a glassy material, such as Corning Code 9608, which may be subsequently cerammed by suitable heat treatment into a glass-ceramic article. Accordingly, in view of the differences in the coefficient of thermal expansion between the glassy stage and the glass-ceramic stage of such material, it is necessary to carefully consider the coefficient of thermal expansion of the insert so that the same will be compatible with the final product.

Although I have disclosed the now preferred embodiments of the invention, it will be apparent to those skilled in the art that various changes and modifications may be made thereto without departing from the spirit and scope thereof as defined in the appended claims.

I claim:

1. A method of press forming an article from molten glass while simultaneously fully encapsulating an insert therewithin which comprises, delivering a first charge of molten glass to a mold, pressing said first charge into an initially formed article while simultaneously pressing an insert within one surface thereof, depositing a second charge of molten glass upon said initially formed article, and pressing said second charge of molten glass into a finished integral article incorporating said initially formed article and simultaneously fully encapsulating said insert therewithin.

2. A method of press forming an article from molten glass while simultaneously fully encapsulating an insert therewithin as defined in claim 1 including the steps of relatively moving a plunger retaining said insert toward said first charge for simultaneously initially forming an article from said charge and pressing an insert within the upper surface thereof.

3. A method of press forming an article from molten glass while simultaneously fully encapsulating an insert therewithin as defined in claims 1 or 2 including the steps of pressing said insert into the upper surface of said first charge as it is being pressed into said initially formed article and positioning an upper surface of said insert substantially flush with the upper surface of said initially formed article.

4. A method of press forming an article from molten glass while simultaneously fully encapsulating an insert therewithin as defined in claim 2 including the step of retaining said insert on the face of said plunger during its downward travel and during the pressing of said first charge by applying a vacuum to said insert through ports in said plunger.

5. A method of press forming an article from molten glass while simultaneously fully encapsulating an insert therewithin as defined in claim 1 including the steps of delivering said first charge of molten glass to a recess formed in a bottom surface of said mold, and pressing said first charge into an initially formed article and simultaneously pressing an insert within one surface thereof such that the upper surface of said initially formed article and the upper surface of said insert are substantially flush with each other and surrounding bottom wall portions of said mold.

6. A method of press forming an article from molten glass while simultaneously fully encapsulating an insert therewithin as defined in claim 1 including the steps of presssing said first charge into an initially formed article and simultaneously pressing said insert within one surface thereof such that the upper surface of said insert and the upper surface of said initially formed article are substantially flush with each other, and said initially formed article is pressed to extend fully across the bottom of said mold and abut sidewall portions thereof.

7. A method of press forming an article from molten glass while simultaneously fully encapsulating an insert therewithin as defined in claim 1 including the step of depositing the second charge of molten glass upon said initially formed article while said article is within said mold.

8. A method of press forming an article from molten glass while simultaneously fully encapsulating an insert therewithin as defined in claims 1 or 7 including the steps of depositing the second charge of molten glass upon said initially formed article and pressing said charge of molten glass into a finished article while said initially formed article is still above its strain point temperature.

9. A method of press forming an article from molten glass while simultaneously fully encapsulating an insert therewithin as defined in claim 8 including the step of simultaneously pressing said second charge of molten glass and fusion bonding said charge with said initially formed article to form an integral article fully encapsulating said insert therewithin.

* * * * *